United States Patent [19]

Chartrand

[11] Patent Number: 5,562,550
[45] Date of Patent: Oct. 8, 1996

[54] MULTIMEDIA GOLF HANDICAP INTERACTIVE TOUCH-SCREEN SYSTEM

[76] Inventor: Victor Chartrand, 1205 E. Tujunga, Burbank, Calif. 91501

[21] Appl. No.: 532,541

[22] Filed: Sep. 25, 1995

Related U.S. Application Data

[63] Continuation of Ser. No. 300,635, Sep. 2, 1994, abandoned.

[51] Int. Cl.$^6$ .................................................. A63B 57/00
[52] U.S. Cl. .......................... 473/131; 473/409; 235/375; 283/904; 364/411
[58] Field of Search ...................... 473/131, 409; 463/25, 40; 364/410–411; 235/375; 283/904

[56] References Cited

U.S. PATENT DOCUMENTS

| | | | |
|---|---|---|---|
| 3,665,494 | 5/1972 | Baumoel | 235/156 |
| 4,266,214 | 5/1981 | Peters, Jr. | 364/410 |
| 4,268,744 | 5/1981 | McGeary | 235/375 |
| 4,319,131 | 3/1982 | McGeary et al. | 235/375 |
| 4,409,471 | 10/1983 | Aigo | 283/904 |
| 4,467,209 | 8/1984 | Maurer et al. | 283/904 |
| 4,474,292 | 10/1984 | Haghiri-Tehrani et al. | 283/904 |
| 4,582,985 | 4/1986 | Lofberg | 283/904 |
| 4,746,787 | 5/1988 | Suto et al. | 235/375 |
| 4,864,592 | 9/1989 | Lee | 364/411 |
| 4,882,474 | 11/1989 | Anderl et al. | 283/904 |
| 4,910,677 | 3/1990 | Remedio et al. | 364/410 |
| 5,127,044 | 6/1992 | Bonito et al. | 379/88 |
| 5,153,826 | 10/1992 | Johnson | 364/410 |
| 5,245,537 | 9/1993 | Barber | 364/410 |
| 5,283,733 | 2/1994 | Colley | 364/411 |
| 5,305,195 | 4/1994 | Murphy | 235/375 |
| 5,319,548 | 6/1994 | Germain | 364/410 |
| 5,324,028 | 6/1994 | Luna | 293/32 R |
| 5,418,353 | 5/1995 | Katayama et al. | 235/375 |
| 5,430,441 | 7/1995 | Bickley et al. | 235/375 |
| 5,478,991 | 12/1995 | Watanabe et al. | 235/375 |
| 5,504,312 | 4/1996 | Morrision et al. | 235/375 |

OTHER PUBLICATIONS

*Electronics Now,* Aug. 1993, p. 4, "What's News: In–Charge Cards".
*Golf Magazine,* vol. 34, Apr. 1992, p. 97, Durkey, "Handicaps 101".

*Primary Examiner*—Jessica J. Harrison
*Assistant Examiner*—Mark A. Sager
*Attorney, Agent, or Firm*—Lewis Anten, Esq.; Amedeo Ferraro, Esq.

[57] ABSTRACT

A computerized golf handicap system comprising a central processing unit (CPU), a touch-screen monitor, an electronic card and a card reader/writer module having proximity recognition means for transceiving data from the electronic card is disclosed. The electronic card has an antenna and a ferroelectric memory chip that is capable of storing a golfer's pertinent data and together with the card reader/writer module functions as the primary means for automatically entering such data into the CPU without making physical contact by waving the electronic card in proximity to the card reader. Any additional data not stored in the electronic card is entered manually via the touch-screen monitor. A golfer's handicap index and index month are automatically updated by the golf handicap system of the present invention.

22 Claims, 9 Drawing Sheets

|  | MEMBER # | INDEX | CURRENT | LOW | TREND |
|---|---|---|---|---|---|
| VICTOR CHARTRAND | 43-3301 |  | 9.1 | 5.7 | 9.5 |
| HOME COURSE: LAKESIDE GOLF CLUB |  |  | AUG |  |  |

COURSE PLAYED: LOS ANGELES COUNTRY CLUB  [NORTH COURSE (76)] [SOUTH COURSE (77)] [OTHER (78)]

TOUCH SCREEN---PUSH TO ENTER ADJUSTED SCORE

[1] [2] [3] [4] [5] [BACK SPACE]
[6] [7] [8] [9] [0] [-]

TEE USED: [CHAMP 47] [PRO 48] [MENS 50] [SENIOR 52] [LADIES 54]

TOURNAMENT: [YES 58] [NO 60]   DATE 10/13/93   [BACK DATE 54]

ADJUSTED SCORE: [- - - 45] [ENTER 46] [CANCEL 68] [RECALL LAST ENTRY 70] [PAST RECORD 62]

FIGURE 4

|  | MEMBER # | INDEX | CURRENT | LOW | TREND |
|---|---|---|---|---|---|
| VICTOR CHARTRAND | 43-3301 |  | 9.1 | 5.7 | 9.5 |
| HOME COURSE: LAKESIDE GOLF CLUB |  |  | AUG |  |  |

COURSE PLAYED: . . . . . . . . . . . . . . . . . . .

| A | B | C | D | E | F | G | H |
|---|---|---|---|---|---|---|---|

| I | J | K | L | M | N | O |
|---|---|---|---|---|---|---|

| P | Q | R | S | T | U | V | W |
|---|---|---|---|---|---|---|---|

| X | Y | Z | RETURN | - | BACK SPACE | SPACE |
|---|---|---|---|---|---|---|

| ENTER | CANCEL |
|---|---|

| MEMBER # | ............... | PHONE # | ............ |
| FIRST NAME | ............... | LAST | ............ |
| ADDRESS | ............... | CITY | ......ZIP..... |
| HOME COURSE | ............... | | |
| LOCAL GROUP | ............... | MBR TYPE: REGULAR  GENDER MALE |

FIGURE 9

MULTIMEDIA GOLF HANDICAP INTERACTIVE TOUCH-SCREEN SYSTEM

This application is a continuation of application Ser. No. 08/300,635, filed on Sep. 2, 1994, now abandoned.

BACKGROUND OF THE INVENTION

1. Field of the Invention

This invention relates to the game of golf, and in particular to a computerized golf handicap system.

2. Description of the Related Art

All active golfing members of golf country clubs possess a paper or cardboard membership identification and handicap index card. In most of the country the handicap index cards are issued by the United States Golf Association (USGA) via various local associations such as the Metropolitan Golf Association (MGA) to the latter's individual member golf clubs. This is known as the Golf Handicap Information Network (GHIN). The major non-participant of this system is Southern California. In this area the handicap cards are issued by Integrated Data Corporation (IDC) via the Southern California Golf Association (SCGA) to the latter's individual member golf clubs. This is known to a lesser degree as the IDC system. Both the USGA and IDC have a computerized database system for tracking, calculating and generating each golfer's handicap index on a monthly basis.

Typically, a handicap index card has only a 12-month capacity from January to December and must be reissued to all card holders at the beginning of each year. Each month a golfer's current handicap index must be written on the handicap index card under the correct monthly heading and validated with a special stamp by the handicap chairman or other official of the home course issuing the handicap index card or in some cases by a head professional employed at that particular golf country club. It is usually inconvenient, difficult, and time consuming to locate the proper golf club official or golf professional to update the handicap index card.

At present, there exists a manual method and a computerized method for inputting a golfer's scores into a golf association's handicap database system. In the manual method, a golfer locates the score posting sheet of the golf country club and writes in his membership identification number, name, par rating for the tees played, his adjusted score, and date played. If the golfer is a non-member of the club played, his entry is written on an "away sheet" (sometimes called a "green sheet") and must include the additional entry designating his home course. In both cases, the score posting sheet must be delivered or mailed to the local golf association for manual entry of the scores for each golfer into the database of the golf association's computer system.

The manual method for entering golf scores is gradually being replaced by a computerized entry system wherein a golfer can input his score after playing a round of golf via a computer. The computerized entry system usually requires the golfer to manually input via a separate 100-key computer keyboard his membership identification number, the adjusted score for that particular round of golf played, the tees used, the tournament status, and other pertinent information. The inputting of this information, by a golfer who is a member of the country club where his entry is being made, can take approximately 14 to 24 key strokes on a keyboard for a single golfer's entry. If a golfer is not a member at the golf country club where his entry is being made, then he must also type in his name and home course which increases the number of key strokes required for the golfer's entry to a total of approximately 38 to 48 key strokes.

As computer keyboards are complicated by the multipurpose keys which can effectively increase the number of functions each of the 100 keys on the keyboard can perform, the inputting of data by a golfer via such a keyboard is time consuming and often confusing, especially to golfers who are not familiar with the layout of a conventional computer keyboard. Further confusion is added by the presentation of approximately six or more entry screens displayed by the computer's monitor during the inputting process for each of the golfer's entries.

As a result, many golf country clubs feel such computer systems are too complicated for their members and mandate that only the golf professional or his assistants are authorized to use the computer system. The golf professional must manually input the information for each of the golfers which is normally provided to the professional on a golfer's handwritten score card or handwritten sheet. This process is time consuming, tedious, expensive, subject to unauthorized entries, and subject to error, be it intentional or accidental.

Consequently, several computerized golf scoring systems have been devised in the past. For example, U.S. Pat. No. 4,268,744, issued to McGeary on May 19, 1981, discloses a system for use in cooperation with identification cards incorporating a magnetic stripe which functions to preserve a record and control the effect of scoring data, such as a golfer's handicap. The McGeary system includes two components, a player unit and an office unit. The player unit processes the data on the identification card to issue score cards and indicate a player's handicap.

U.S. Pat. No. 4,319,131 issued to McGeary et al. on Mar. 9, 1982, discloses a system for use in cooperation with record cards and identification cards to indicate scoring data. In McGeary et al.'s system, the record cards incorporate a magnetic stripe and preserve duplicate printed and magnetic records of scoring data including a golfer's handicap. The McGeary et al system includes an operating unit with a card printer. A player's data is entered for processing and for entry on a record card and for use in issuing identification cards that indicate a player's handicap.

U.S. Pat. No. 3,665,494 issued to Baumoel on May 23, 1972, discloses a golf computer for computing the handicap of a golfer from information corresponding to golf scores and course ratings entered on a conventional punch card. The machine performs its function by reading the information stored on the punch card and by using solid-state and the electro-mechanical devices to derive the handicap defined by the United States Golf Association.

All of the systems described above require the entry of data either through a keyboard or by a data storage card that must make physical contact with a card reader. The use of cards with magnetic stripes for storing data has proven to be problematic as the capacity for storing data is limited and because the magnetic stripe is easily damaged, resulting in a limited life span of such cards. Further, most systems utilizing cards with a magnetic stripe are limited to having read only data stored on the magnetic stripe since in order to write data into the magnetic stripe, the magnetic stripe would first need to be erased by an erasing means and new data would be written into the magnetic stripe by a writing means. Magnetic read-write card readers are available but these are expensive, are subject to unauthorized printing of bogus credit cards, have low reliability, and require high maintenance to service its mechanical rollers, pulleys, springs, and magnetic heads. Also, the magnetic stripe has the inherent limitations of becoming easily erased when it is exposed to magnetic fields and can be easily damaged by scratching or by being exposed to other harmful elements, thus significantly reducing the longevity of the magnetic stripe. A magnetic stripe is further limited in the amount of information which may be stored in the magnetic stripe as a result of its size. As a consequence, the magnetic stripe either needs to be relatively large or multiple magnetic stripes are required which in turn would also require a read-write card reader having separate, erase, read and write heads for each stripe.

None of the prior computerized golf scoring systems provide a golf handicap entry system wherein a golfer has a electronic card capable of storing all of a golfer's pertinent information that can be read remotely by a computer without any physical contact with the computer system such that all of the pertinent information is automatically entered into the computer. Further, none of the prior golf scoring systems provide for the entry of a golfer's score without the use of a separate keyboard and none provide the golfer with a handicap card whereby the current handicap index is automatically updated and stored on the golfer's electronic card. Further still, none of the prior computerized golf scoring systems provide for a multimedia system wherein a golfer may enter his score and other pertinent information via a touch-screen monitor wherein the touch-screen monitor also functions to display video and interactive programs when the touch-screen is not being used for the entry of a golfer's score.

OBJECTS OF THE PRESENT INVENTION

It is an object of the present invention to provide a golf handicap system where a golfer's pertinent information is automatically entered into a computer system and displayed instantaneously at the wave of an electronic card.

It is another object of the present invention to provide a golf handicap system having an automatic updating of the handicap index and index month that are stored on an electronic card.

It is a further object of the present invention to provide a golf handicap system that is faster, more reliable and easier to use than prior systems.

It is yet another object of the invention to provide a golf handicap system which may easily be used by all golfers.

It is yet a further object of the present invention to provide a golf handicap system which automatically adds or cancels members.

It is still yet another object of the present invention to provide a golf handicap system in which the need to issue a new handicap index card every year is eliminated.

These and other objects of the present invention will become apparent from a review of the accompanying drawings and the detailed description of the drawings.

SUMMARY OF THE INVENTION

The present invention is a golf handicap system comprising a central processing unit (CPU), a touch-screen monitor, an electronic card having information storing means, an antenna module having proximity recognition means for transceiving data to and from the electronic card, a read-write controller module that holds the data in random access memory (RAM) for communications interface to the CPU or to the electronic card, and appropriate computer software programs. The electronic card has an antenna and a ferro-electric memory chip that is capable of storing a golfer's membership identification number, name, home course handicap indexes, index month and other pertinent data. The electronic card together with the read-write controller module and antenna module function as the primary means for automatically entering such data into the CPU by the waving of the electronic card in proximity to the antenna module. The read-write controller module provides for the automatic updating of a golfer's handicap index and index month stored on the electronic card during the waving of the electronic card. As the electronic card is being read by the read-write controller module, the handicap index and index date stored in the electronic card is compared to the current month's handicap index issued by the golfer's association. If the latest golf handicap index or the index does not correspond to the handicap index or index stored on the electronic card, the electronic card is updated with the latest handicap index and/or index month.

The touch-screen monitor displays a score entry screen which provides for the immediate entry of additional data not stored in the electronic card and other information such as the golfer's adjusted score, date shot, tees used, tournament status, and other pertinent data. In the preferred embodiment of the present invention, the score entry screen of the touch-screen monitor defaults to the present date, "men's tees", and "non-tournament" status to reduce the number of entries required for each golfer. A "course" played default will also exist when a golf club has two or more courses. However, a means for immediately changing the default entries is provided if the golfer's data to be entered differs from the default settings. Typically, only three quick touches of the touch-screen would be required for an entry.

The electronic card is approximately the same size as a credit card and contains a memory chip and an antenna. When waved within approximately six inches of the antenna module, an interrupt mechanism will switch an ongoing software program in the CPU to the score entry screen. Simultaneously, the golfer's name, handicap number, home club, handicap index, and index month will be read from the electronic card by a radio signal and presented immediately to the golfer on the score entry screen of the touch-screen monitor. For example, to activate the golf handicap system of the present invention the golfer need only wave the electronic card in the proximity of the electronic antenna module for the golfer's data and the default entries to appear on the touch-screen monitor. If the default entries are correct, the golfer touches only the appropriate icons on the touch-screen monitor representing the numbers of the score shot to enter the score shot for a particular round of golf. The golfer then touches the "ENTER" icon to enter the score and the screen of the touch-screen monitor automatically exits the score entry mode and returns to a previous display. Eliminated is the process of locating the proper keys on a 100-key keyboard, positioning the cursor from line to line, typing the required information, and hitting "returns" for each entry.

In the preferred embodiment, the system of the present invention further comprises a multimedia means such that when the touch-screen monitor is not activated for use in the entry of a golfer's score, the touch-screen monitor functions as a video display for presenting programming such as advertisements and the like for promoting travel packages, promoting sales of merchandise, and for displaying tournament schedules, and instructional programs for example. The touch-screen monitor would normally be presenting a video program until it is interrupted by a golfer having an electronic card and desiring to enter his score at which time the score entry mode would be activated and the score entry screen is presented to the golfer. Once the golfer has completed his score entry, the touch-screen monitor would automatically return to the video program mode. As the system of the present invention may be coupled to a computer network and database via modem, cable or satellite, for example, the programming and information which can be displayed by the system of the present invention is unlimited. It is appreciated that the system of the present invention may also provide a means for golfers at different locations to interact with each other via the touch-screen monitor.

DETAILED DESCRIPTION OF THE DRAWINGS

Figure 1:
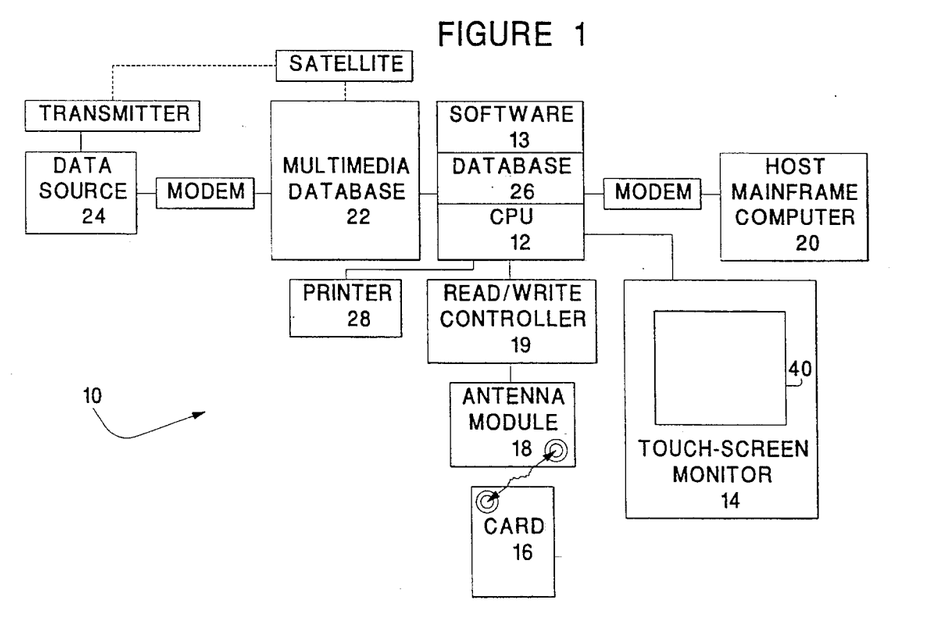
FIG. 1 is a block diagram illustrating the golf handicap system of the present invention.

Referring to FIG. 1, a block diagram illustrating the preferred embodiment of the system of the present invention, generally referred to by numeral 10, is shown. The system 10 comprises a central processing unit (CPU) 12 with related software 13, at least one touch-screen monitor 14, an electronic card 16, an antenna module 18, and a read-write controller 19. The CPU 12 is coupled to the read-write controller 19 and to the touch-screen monitor 14 and is capable of communicating directly with a host mainframe computer 20. The CPU 12 may also be coupled to a multimedia database 22 capable of storing a variety of multimedia programs available from a data source 24 via modem, cable or satellite, for example, such multimedia programs may be readily accessed by CPU 12.

The host mainframe computer 20 may be any system that stores golf information and that can send a packet of information which can be interpreted by a network of member golf clubs such as the mainframe computer systems of golf associations, like the USGA. The sending and/or receiving of information can be accomplished via modem, through a computer network system, or other well-known means such as cable, satellite transmission and the like. The host mainframe computer 20 keeps track of each golfer for all member golf clubs and is the repository for the last twenty adjusted scores, dates shot, converted differentials, handicap index for the current month and for each of the previous 11 months, and other pertinent data for each golfer. Updated data is sent out once a month by the host mainframe computer 20 to each member golf club which will parse the data (separate imported data into separate columns so that it appears correctly in a worksheet) into its local database.

The host mainframe computer 20 must be able to perform computations such as computing the converted differential from which the handicap index is calculated. The converted differential equals the adjusted score minus the course rating multiplied by 113 divided by the slope. For example, at a golf club where the regular men's tees have a course rating of 70.1 and a slope of 121, and if a score of 80 were shot, the converted differential would equal $(80-70.1) \times (113/121) = 9.2$. The current handicap index for an individual golfer is calculated once a month by averaging the ten lowest converted differentials and multiplying the average by 96 percent. The current handicap index is stored in the electronic card 16.

The electronic card 16 is capable of storing a golfer's pertinent data and together with the read-write controller 19 functions as the primary means for automatically entering such data into the CPU 12. The touch-screen monitor 14 functions to display data entered from the electronic card 16 and also functions as a secondary means for manually entering any additional data not stored in the electronic card 16. Further, a golfer's pertinent data that is normally stored in the electronic card 16 may also be entered manually via the touch-screen monitor 14 in the event the golfer loses or forgets his electronic card 16.

In the preferred embodiment, the CPU 12 has a local database 26 for containing a list of the information for the current members of the golf club at which system 10 is installed. The local database 26 contains a flagging means for labeling each record to indicate to the CPU 12 which data has already been sent to the host mainframe computer 20 and which data needs to be sent. By keeping the data in the local database 26, the golfers can access the data much faster than is possible with data stored in a remote database. The system 10 also comprises a means for requesting information for a non-member of the golf club where the system 10 being used by the non-member is installed. A golfer's pertinent information that is stored in system 10 may be printed out for the golfer via the printer 28.

Figure 2:
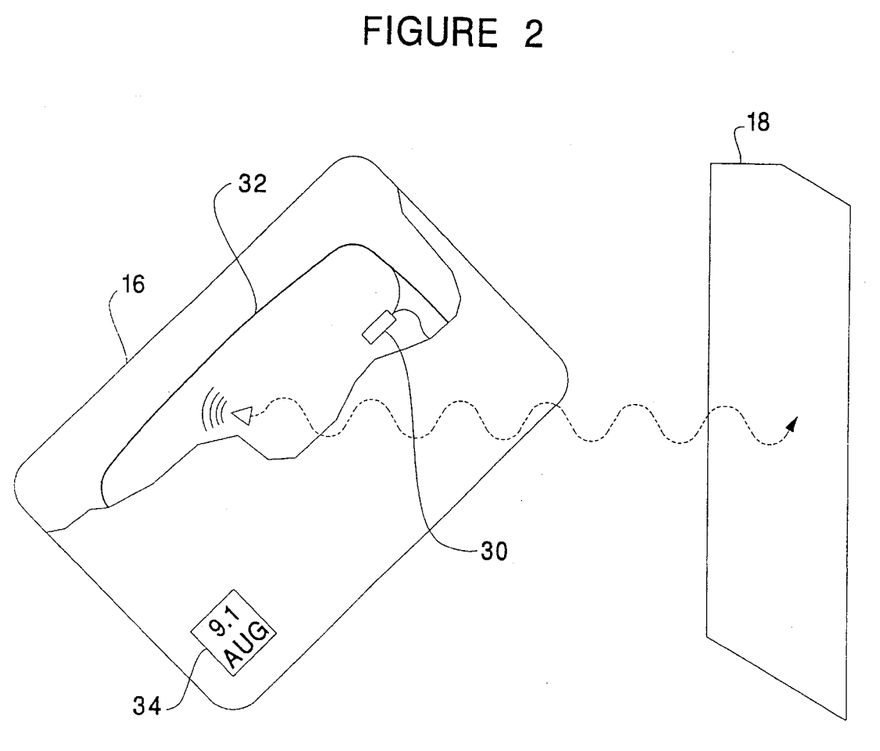
FIG. 2 is a diagrammatic representation shown in partial cutaway of an electronic card used in the golf handicap system of the present invention.

Referring to FIG. 2, the electronic card 16 in the preferred embodiment, is a digital radio frequency (RF) memory card having a fully self-contained contactless, inductively powered digital radio frequency memory and has the overall dimensions approximately equal to a credit card. Such an electronic card is commercially available from Racom Systems, Inc., Englewood, Colo. The electronic card 16 comprises a ferromagnetic memory chip 30 and an antenna 32. Preferably, the memory chip 30 contains approximately 1,024 bits of nonvolatile ferroelectric random access memory with high-speed read/write capability along with all related analog and digital functions on a single proprietary CMOS Application Specific Integrated Circuit (ASIC). If additional memory is required, a chip having a greater memory such as 4,096 bits would be used.

The antenna 32 is preferably a single coil and is used for both data transmission and reception as well as for powering the electronic card 16. The electronic card 16 receives power from the read-write controller 19 via the antenna module 18 which generates a 125 kHz incident magnetic field that is FSK modulated to transmit commands as well as data. Such an antenna module 18 is commercially available from Racom Systems, Inc., Englewood, Colo., and is known as the In-Range Racom LFC Digital RF Communications Controller. Upon detecting and decoding valid transmission from the antenna module 18, the electronic card 16 encodes its response and transmits a reply to the antenna module 18 at 62.5 kHz using PSK modulation.

In the preferred embodiment, the electronic card 16 has a read speed of approximately 7,812 bits per second. Normally, each alphabet letter and the numbers 0 through 9 are represented by 38 different coded bytes (each byte contains 8 bits). In the preferred embodiment, the data stored in the memory chip 30 uses only an average of 45 alphanumeric characters or 360 bits, such that the data stored in the electronic card 16 will be read in less than 1/20 of a second. Further, the data stored in the electronic card 16 is addressable, such that some or all of the data in the electronic card 16 can be irreversibly locked during programming if desired. Typically, the data that is desired to be irreversibly locked in the electronic card 16 includes an individual golfer's pertinent information such as membership identification number, name, and home club for example. Information that is typically desired to be stored in a "non-locked" mode includes for example, an individual golfer's handicap index and index month which need to be updated monthly.

The initial data to be stored in the electronic card 16 is programmed into the memory chip 30 through any personal computer having a RS-232 port coupled to the read-write controller 19. The electronic card 16 in which the initial data is to be stored is placed on or near the antenna module 18 and the initial data is entered into the electronic card 16. Once data is stored into the electronic card 16, the electronic card 16 has a data retention of approximately 10 years without power and a memory endurance of 100 billion read/write cycles.

Data stored in the electronic card 16 is read by the read-write controller 19. The antenna module 18 and the read-write controller 19 comprise a proximity recognition device which is capable of reading data from the electronic card 16 without making physical contact with the electronic card 16. In the preferred embodiment of system 10, data stored in the electronic card 16 typically comprises a golfer's membership identification number, name, home course, handicap index, index month, and other pertinent information. When the electronic card 16 is waved within approximately six inches of the antenna module 18, the golfer's membership identification number, name, home course, handicap index, index month, and any other pertinent information will be read from the electronic card 16 by the read-write controller 19 via a radio signal and is presented immediately to the golfer on the touch-screen monitor 14. There is no need for the golfer to physically engage the electronic card 16 with the antenna module 18 in order to enter his information into the system 10, which substantially reduces the amount of time required for the entry of data from the electronic card 16 as compared to more traditional methods such as swiping a card having a magnetic stripe or optically scanning a card with a bar code. Also, eliminated is the process of locating the proper keys on a 100-key keyboard, positioning the cursor from line to line, typing in the required information, and hitting "returns" for each entry.

The electronic card 16 with the antenna 18 and read-write controller 19 enable the entry of handicap scores in less than two seconds and greatly reduce the work load for the entry of handicap scores, especially at golf clubs that require guest score entries on an away or green sheet. For example, at a golf club wherein 150 guests play in a three day tournament, each guest must write their membership number, name, home course, course rating, adjusted score, and date played on an away or green sheet. Then a person, usually the assistant pro, has the burdensome task of manually entering the 450 scores (three scores for each guest) into the computer system. In each case the assistant pro must manually type the golfer's membership identification number, name, home course, adjusted score, date shot, tees used, tournament status, and other data for entry into the computer system. At an average of 40 keystrokes per entry, this is an overwhelming total of 18,000 keystrokes! Thus, the burden on the golfers of providing the away or green sheet would be eliminated along with the burden on the assistant pro to manually enter the information from the away or green sheet by enabling the golfers to make their own entries directly, quickly and efficiently into system 10.

A major feature of the electronic card 16 is the ability to perform automatic updating of the handicap index and index month on the electronic card 16. This will occur during the waving of the electronic card 16 in the proximity of the antenna module 18 whenever the handicap index and/or index month in the CPU 12 disagrees with the handicap index and/or index month on the electronic card 16. When the electronic card 16 is waved past the antenna module 18, a read/write/verify cycle will occur, such that the handicap index is read from the electronic card 16, the new handicap index is written on the electronic card 16, and the new handicap index is read from the electronic card 16 and verified as being correct.

Another feature of the electronic card 16 is that the full outer surface of the electronic card 16, unlike magnetic stripe cards, is available for messages such as the golfer's name, home course, full color photo, and company logo. The electronic card 16 is presently designed for user and printer compatibility with an ideal thickness of 0.033 inches which makes it well accepted by and well within the limits of the 0020 to 0.060 inch range of standard credit card printers. The printout of an image, logo or text on the electronic card 16 can be done expertly in the field (unlike magnetic stripe cards which cannot endure the pressure applied by the printer) and is extremely durable because the ink is partially embedded in the PVC or plastic surface. A typical photo-printing setup would consist of a camera connected to a computer containing the proper software to drive the printer. A single electronic card 16 or a 20-card stack would self-feed through the printer.

It is also appreciated that the electronic card 16 may include a liquid crystal display (LCD) 34 to display the current handicap index and/or index month stored in the electronic card 16, or to display the credit balance of the golfer available at his home course golf shop or to display the credit balance available (or card value) where the electronic card 16 is credited directly by cash or credit card inputs and depleted by various debits. The electronic card 16 may further include a power source such as a solar cell or photo-voltaic cell to power the LCD 34.

In the preferred embodiment of system 10 software 13 required to run system 10 is written in C or C++ language and operates an IBM compatible personal computer equipped with a touch-screen monitor 14. The software 13 is preferably written to operate in the Microsoft Windows operation environment. However, it is appreciated that software 13 could be adapted to operate under other environments if necessary. The input and output of data into system 10 by a golfer is primarily done through the electronic card 16, antenna module 18, and read-write controller 19 and secondarily through the touch-screen monitor 14 containing entry icons and entry fields which the user will activate by touching the entry icons on the touch-screen monitor 14. The antenna module 18 is connected to a read-write controller 19 which is connected by cable to the RS-232 port of the CPU 12. An optional read-write controller card that plugs directly into a spare PC slot is also available. This would utilize a direct coaxial cable from the external antenna module 18 to the read-write controller card. In the one embodiment, the antenna module 18 and the read-write controller 19 are connected to the CPU 12 via a classic binary serial interface.

When an electronic card 16 is waved in front of the antenna module 18 the software 13 determines whether the electronic card 16 is valid. The instant the electronic card 16 is waved in the proximity of the antenna module 18, the random access memory (RAM) of the read-write controller 19 is loaded with the golfer's membership identification number, name, home course, handicap index, and index month, and a Request to Send (RTS) character is sent to the CPU 12. The CPU 12 then immediately initiates a handicap score entry touch-screen and sends a Clear to Send (CTS) character back to the read-write controller 19. The data from the electronic card 16 is then instantly read into the CPU 12 and is directed to specific addresses on the touch-screen monitor 14. The touch-screen monitor 14 displays a score entry touch-screen for the golfer to enter information regarding the last game played.

Figure 3:
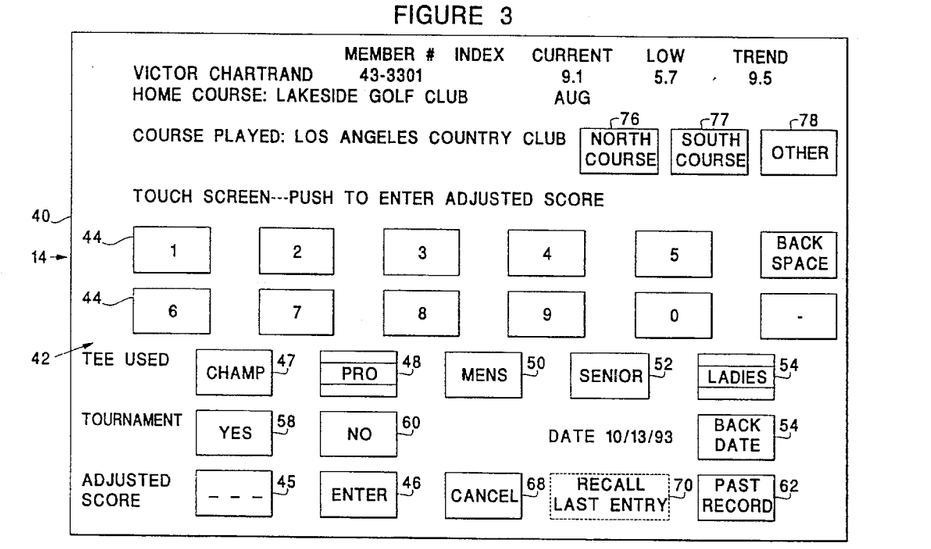
FIG. 3 is a schematic representation of a touch-screen score entry display for the entry of a golfer's score directly through the touch-screen monitor of the golf handicap system of the present invention.

Referring to the FIG. 3, in the preferred embodiment the touch-screen monitor 14 has a viewing screen 40 that is touch responsive and is activated when a person makes physical contact with the viewing screen 40. The viewing screen 40 displays a variety of entry icons used for the entry of data in addition to the data that has been entered from the electronic card 16. The touch-screen monitor 14 may be any of the well-known monitors such as the touch-screen monitor that is commercially available from Carroll Touch, Round Rock, Tex. or Micro Touch Systems, Inc. Methuen, Mass.

The entry icons are presented to the golfer on a score entry display 42 through the viewing screen 40, each entry representing a variety of functions. For example, numeric icons 44 represent the numbers 0 through 9 used for entering a golfer's adjusted score. After a golfer has finished a round of golf, the golfer waves his electronic card 16 in the proximity of the antenna module 18. The data on the electronic card 16 is read, displayed on the touch-screen monitor 14 and the score entry display 42 is presented to the golfer. The golfer then enters his adjusted score by touching the numeric icons 44 such that data is inputted directly through the touch-screen monitor 14, eliminating the need for a separate keyboard. The adjusted score appears in the adjusted score box 45 and if correct, the golfer then touches the "enter" icon 46 to enter the score into the system 10.

In the preferred embodiment of system 10, information regarding the golfer's round of play will automatically default to the course played, present date, the men's tee, and non-tournament play. In the event any of the conditions are otherwise, the golfer can change the default setting, by touching the appropriate entry icons. For example, to select the tee used, the golfer can touch the "champ" icon 47, the "pro" icon 48, the "mens" icon 50, the "senior" icon 52, or the "ladies" icon 54. The "back date" icon 56 may be used to change the date to make an entry for a round of golf played on a prior date. The golfer may also select the tournament status by touching the "yes" icon 58 or the "no" icon 60. The CPU 12 then automatically stores the data and if necessary, updates the golfer's handicap index and/or index month. Additionally, the golfer may view his previous record by touching the "past record" icon 62 which displays the golfer's last twenty scores, dates shot, converted differential entries, and handicap indexes. It is appreciated that in addition to the previous record, a golfer's credit balance available at his home course golf shop may be displayed on the viewing screen 40. Further, a portion of the viewing screen 40 may be allocated for providing commercial advertisements, sponsors, etc.

If the golf club has more than one course, the system 10 would default to the most popular course. However, the golfer may have the option of changing the course played by touching the "North Course" icon 76 or the "South Course" icon 77. Touching of the "other" icon 78 would be required if the course is different than the course at which the golfer is entering his score.

Figure 4:
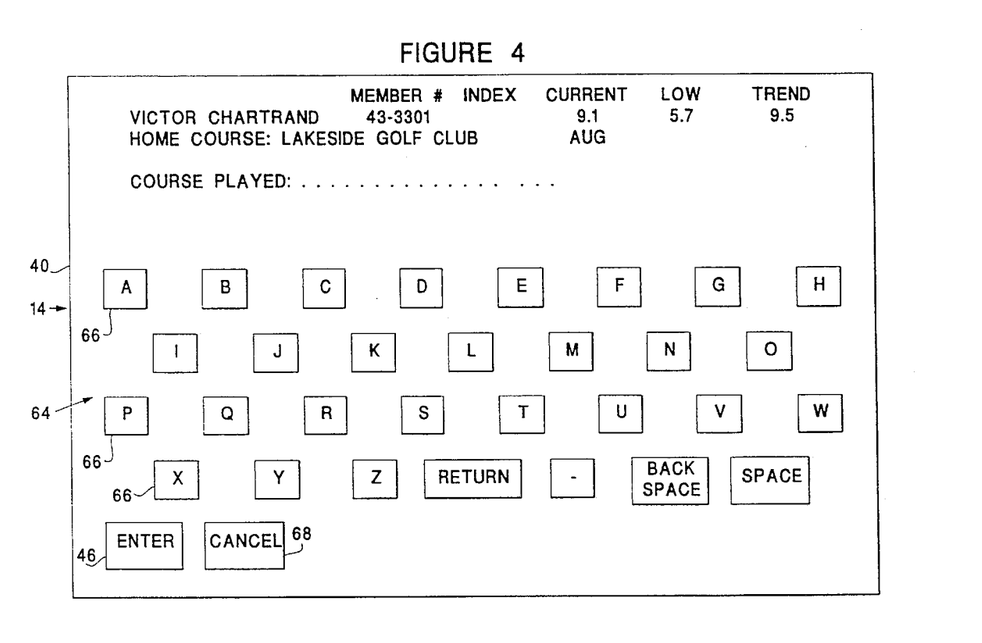
FIG. 4 is a schematic representation of a touch-screen manual course played entry display for the manual entry of the name of the course played directly through the touch-screen monitor of the golf handicap system of the present invention.

Referring to FIG. 4, if the "other" icon 78 is selected by the golfer, a manual course played entry display 64 appears with a set of alphabetical icons 66 for the manual entry of the name of the course played directly through the touch-screen monitor 14. Once the correct name of the course played is typed by the golfer, the golfer selects the "enter" icon 46 which returns the golfer to the score entry display 42. The golfer then proceeds to select the numeric icons 44 to enter his adjusted score.

Referring again to FIG. 3, the information is displayed to the golfer on the score entry display 42, and the golfer has the option to select either the "cancel" icon 68 or accept the current entry by selecting the "enter" icon 46. If the "cancel" icon 68 is selected, system 10 waits in the score entry mode for a preset time period for the same or next electronic card 16 to be waved in the proximity of the antenna module 18. If the preset time period expires, the touch-screen monitor 14 returns to its previous state. If the golfer accepts the entry by selecting the "enter" icon 46, system 10 performs a validation check of the golfer's entered data. If the data is invalid, the golfer is prompted by the appearance of a highlighted message "invalid entry" to correct or cancel the operation. If all the data is correct, the system 10 stores the record in the local database 26 to be sent to the host computer in batch form at regular intervals. The touch-screen monitor 14 automatically and immediately returns to its previous state.

A golfer can change the last score entered if it has not yet been sent to the host computer 20. This can be accomplished by the golfer waving his electronic card 16 in front of the antenna module 18. If the "un-sent" entry is found, that entry will be displayed on the score entry display 42 by the golfer's touching of a "recall last entry" icon 70 that would appear on the touch-screen monitor 14 only if recall is available. The golfer can then change the "un-sent" entry and it is again saved in the local database 26 as described above.

The local database 26 at each golf club will track the gender and local golf association for each member by membership identification number. Typically, a golf club might have a senior men's association and a regular mens association. The ladies may also have a regular ladies association and a duffers association. In any case, specific entries for gender and association will not be required when posting scores on the touch-screen monitor 14 by a member of the golf club at which the score is being entered.

The software required for routing the touch-screen monitor 14 inputs is straight forward. For example, an external controller with a binary serial interface could be connected to the RS-232 port of the CPU 12. Preferably, a controller card designed to interface directly with a PC BUS (internal pathway in which signals are sent from one place to another) would plug into an expansion slot of an IBM compatible PC and communicate with and draw power directly from the PC BUS. An eight or nine lead cable would connect the touch-screen monitor 14 directly to the controller card. The controller card's function is to convert the interrupted data of each touch (which might be a beam, current flow, acoustic wave, etc . . . ) into the form of X, Y (X-axis, Y-axis) coordinate pairs for application processing.

Figure 5:
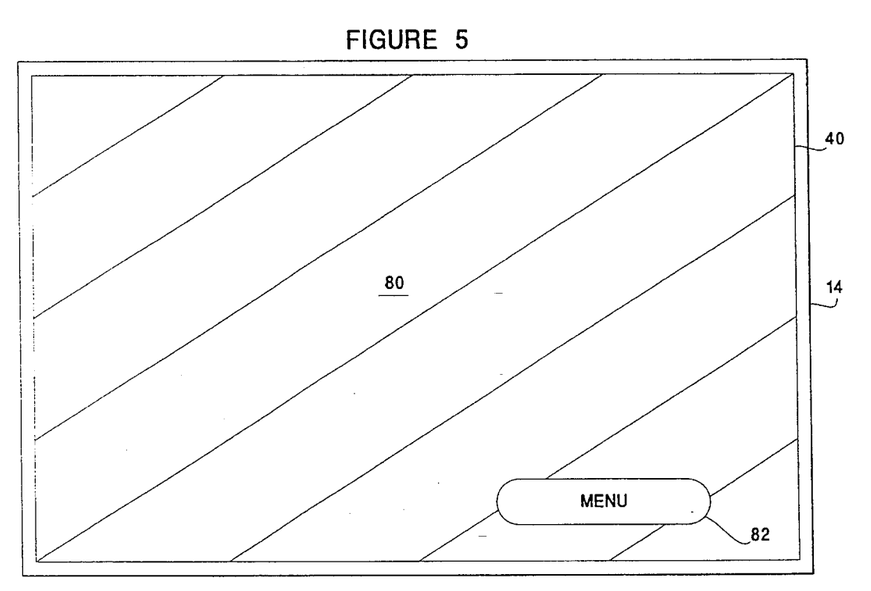
FIG. 5 is a schematic representation of a touch-screen monitor displaying a video image through the touch-screen monitor of the golf handicap system of the present invention.

Referring to FIG. 5, in the preferred embodiment the viewing screen 40 when not in use for entering a golfer's adjusted score, displays a video image 80. A "menu" icon 82 is provided to interrupt the displaying of the video image 80.

Figure 6:
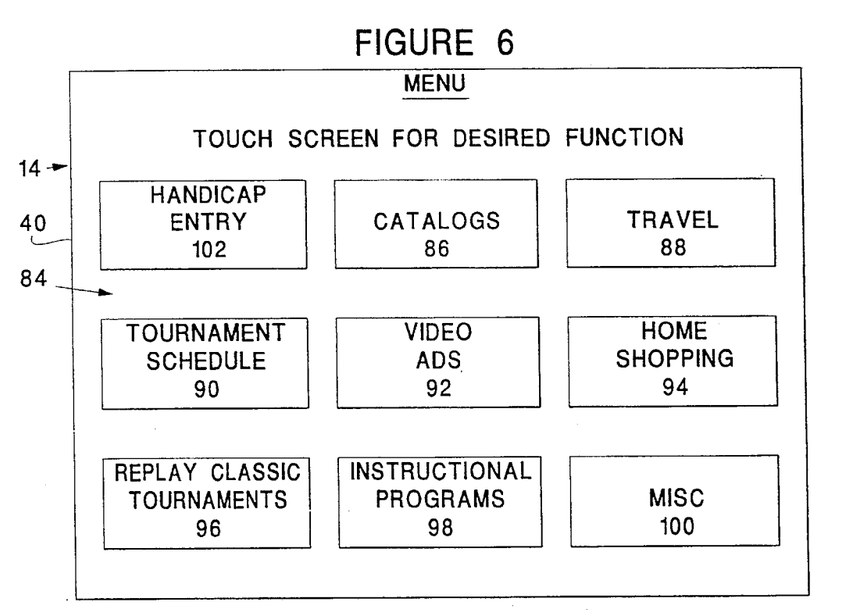
FIG. 6 is a schematic representation of a touch-screen main menu display for selecting desired functions directly through the touch-screen monitor of the golf handicap system of the present invention.

Referring to FIG. 6, once the "main" menu icon 82 is selected a main menu display 84 appears on the viewing screen 40 to allow a golfer to select any of a variety of the multimedia functions of the system 10. For example, if a golfer desires to view a catalog of merchandise available, the "catalogs" icon 86 would be selected to view information regarding travel related information, the "travel" icon 88 would be selected. If a golfer would like information on tournament schedules, the "tournament schedule" icon 90 would be touched by the golfer and information regarding tournaments would be presented via the touch-screen monitor 14. Similarly, if the video ads icon 92 is touched, the golfer is presented with advertisements of merchandise available. The home shopping icon 94 presents the golfer with a home shopping program. If a golfer desires to view classic golf tournaments, the "replay classic tournaments" icon 96 is selected. Instructional programs may be viewed by the golfer's selection of the "Instructional programs" icon 98. A "misc" icon 100 is provided for other features available on system 10. The presentation of information may include still video images as well as full-action, full-frame video programs either stored in the database in hard drive and/or CD-ROM format, recorded on video tape, conducted via cable or satellite or other video programming means.

In the event that a golfer loses or forgets his electronic card 16, system 10 may be manually activated by manually touching the "menu" icon 82 on the viewing screen 40 of the touch-screen monitor 14, such that the main menu display 84 is presented and then touching the handicap entry icon 102 on the main menu display 84. The golfer is presented with the score entry display 42 for the entry of his adjusted score. If the golfer who forgot or lost his electronic card 16 is a member of the golf club at which the system 10 is installed, the golfer simply enters his membership identification number via the numeric icons 44, and then proceeds to enter his score as described above. If a golfer's membership number comprises a combination of numerals and alphabetical characters, an alphabetical character selection icon would be included for inserting the desired alpha character to permit the entry of such membership numbers.

Figure 7:
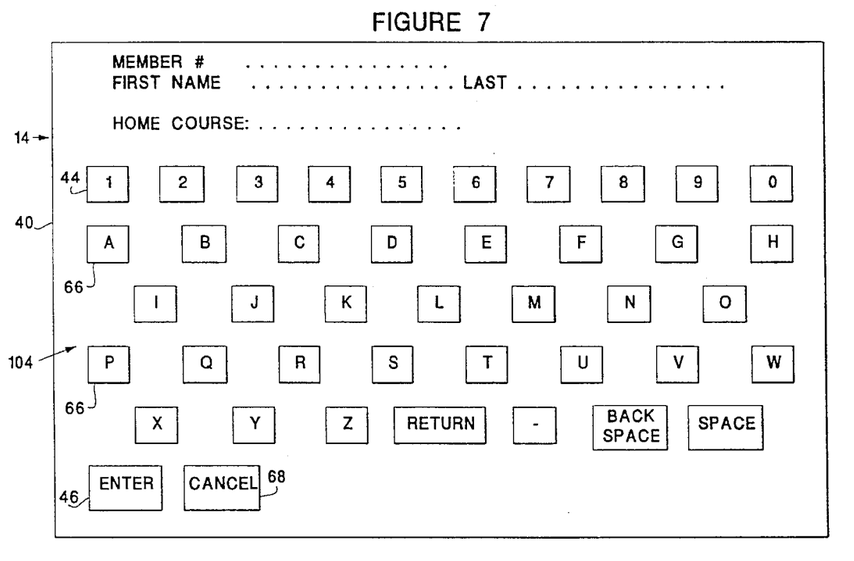
FIG. 7 is a schematic representation of a touch-screen manual data entry display for the manual entry of data directly through the touch-screen monitor of the golf handicap system of the present invention.

Referring to FIG. 7, if the golfer who lost or forgot his electronic card 16 is not a member of the club or is not in the local database of the club, a manual data entry display 104 is presented to the golfer to manually enter data into system 10. The alphabetical entry icons 66 are touched by a golfer such that the data is inputted directly through the touch-screen monitor 14, eliminating the need for a separate keyboard. It is appreciated that the entry of data through the touch-screen monitor 14 using the alphabetical icons 66 of the manual entry display 30 be limited to circumstances where the golfer does not have his electronic card 16 as the entry of the bulk of the data entry is accomplished automatically and more efficiently by way of the electronic card 16 as described above.

Figure 8:
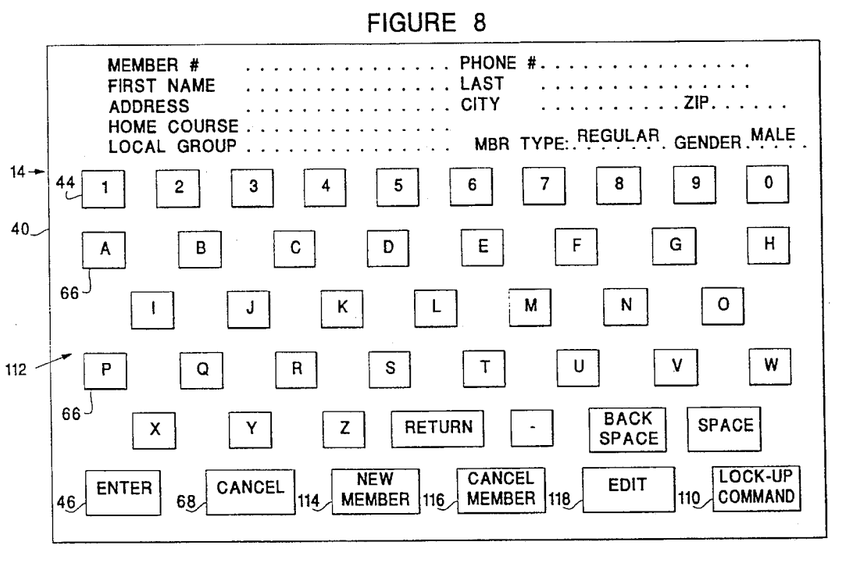
FIG. 8 is a schematic representation of a utility entry touch-screen display for the entry of data and special functions directly through the touch-screen monitor of the golf handicap system of the present invention.

Referring to FIG. 8, each golf club has a special utility card, similar to the electronic card 16, except that it also comprises a special access code, to allow the handicap chairman, the golf professional, or club administrator to access the utility entry display 112 in order to change database information to add new members by selecting the "new member" icon 114, to cancel members by selecting the "cancel member" icon 116, to edit database information by selecting the "edit" icon 118, and to cancel an electronic card 16 with the "lock-up command" icon 110. This functionality will be accomplished by using a utility entry display 112 which contains a set of alphabetical icons 66 representing the letters of the alphabet and a set of numeric icon 44 representing the numbers 0 to 9.

If an electronic card 16 is lost or stolen, an order can be entered through the "lock-up command" icon 110 on the utility entry display 112 to cancel that electronic card 16. Each electronic card 16 can be selectively identified by a 4-digit personal identification number PIN or by the membership number in conjunction with a one-digit PIN. In the latter case, the issuance of a new replacement electronic card 16 would contain the same membership number but the one-digit PIN would advance from 0 to 1. Once the missing electronic card 16 with the 0 PIN is used, the FRAM chip on that electronic card is irreversibly blocked.

Figure 9:
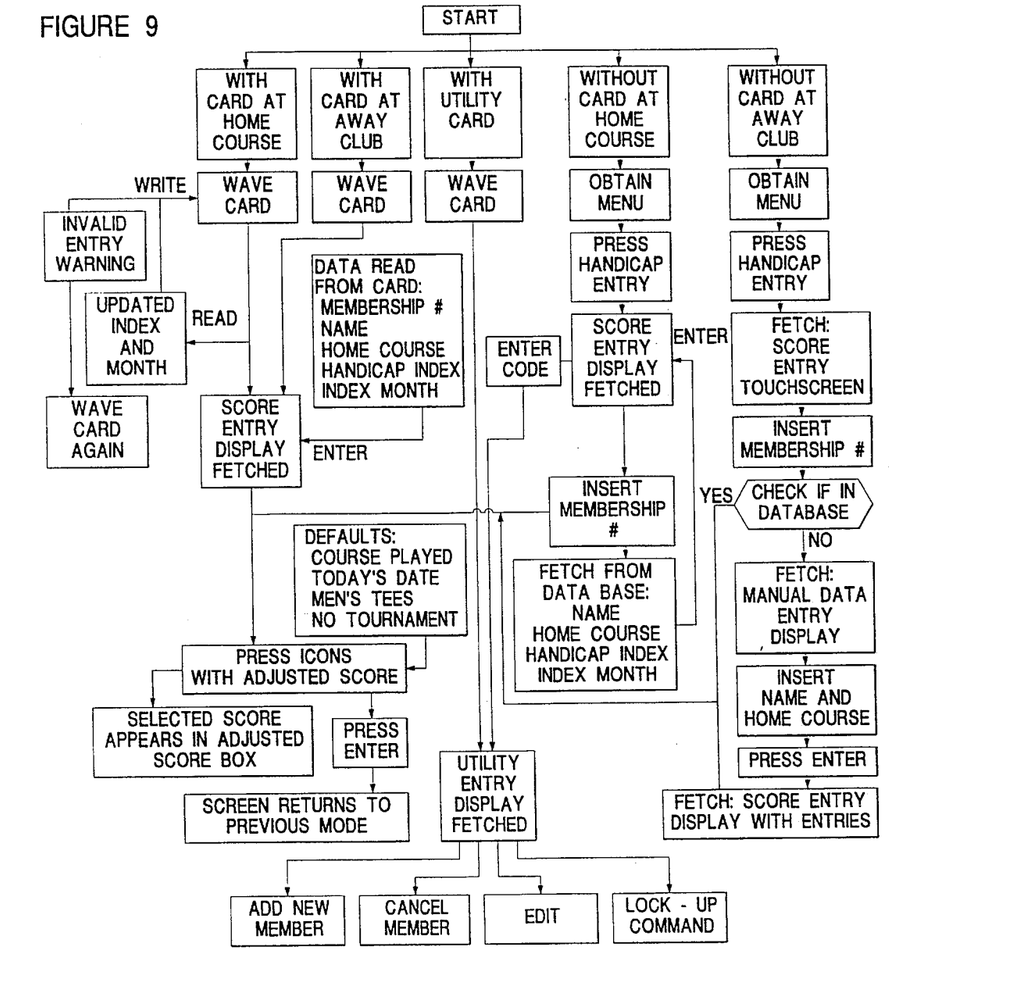
FIG. 9 is block diagram illustrating the various functions of the golf handicap system of the present invention.

Referring to FIG. 9, a block diagram illustrating the various functions of system 10 described above is shown.

When an SCGA golfer is playing in Northern California or out of State, entries can be made into the prevailing USGA GHIN system for later routing to the SCGA IDC system. The golfer merely backspace the cursor and inserts an 8 at the beginning of his 6-digit membership number. Reverse routing would occur for USGA GHIN members playing and making entries in Southern California but no special routing code is required.

There are well over ten million golfers in the United States. It is expected that a country-wide handicap membership numbering system will be adopted and, with ten million or more members, will require an 8-digit membership numbering system. The system 10 has allocated 8 digits for membership numbers whereas the USGA with 7 and the SCGA with 6 have not.

The system 10 will normally be located in the golf shop area, but CPU 12 can handle a multiuser system consisting of satellite terminals (an input/output device, consisting of touchscreen entry and video display) located in the men's locker room and/or the ladies locker room. The administrative office would also be a logical location for a terminal as they directly track the membership roster and could utilize the utility entry touchscreen (although a keyboard option would also be available) to update the roster. These updates are presently done by phone or mail.

While the present invention has been described in detail with regards to the preferred embodiment, it is appreciated that other variations of the present invention may be devised which do not depart form the inventive concept of the present invention.

What is claimed is:

1. A golf handicap system, comprising:

a central processing unit having means for processing and storing data, said central processing unit being coupled to at least one viewing monitor for displaying data;

a contactless electronic card for storing data, said electronic card having means for transmitting and receiving data via radio waves;

card reading means for reading data stored in said electronic card without making physical contact with said electronic card, said card reading means being coupled to an antenna means for receiving data via radio waves from said electronic card, said card reading means being coupled to said central processing unit and transmitting said data stored in said electronic card to said central processing unit;

manual data entry means for inputting data into said central processing unit said data including at least one score for a round of golf played by a golfer; means for updating a golfer's handicap index and index month; and correcting means for changing the last score entered by a golfer, said correcting means including means for allowing the last score entered by a golfer to be corrected during a set period of time and means for preventing the correcting of the last score entered by a golfer after said set period of time expires.

2. The system of claim 1 in which said viewing monitor is a touch-screen monitor having a touch sensitive responsive display for manually inputting data into said central processing unit.

3. The system of claim 2 in which said touch responsive display includes at least one touch responsive icon for inputting data into said central processing unit.

4. The system of claim 1 including a writing means for inputting data into said electronic card.

5. The system of claim 4 in which said writing means is coupled to a transceiving means for transmitting and receiving data from said electronic card without making physical contact with said electronic card.

6. The system of claim 1 including means for verifying a golfer's identity.

7. The system of claim 1 including a multimedia database for storing multimedia data.

8. The system of claim 7 in which said multimedia data comprises video images.

9. The system of claim 7 in which said multimedia data comprises sound.

10. The system of claim 7 in which said multimedia database is coupled to a remote data source.

11. The system of claim 1 including means for communicating with a remote host mainframe computer.

12. The system of claim 1 in which said electronic card comprises a display means for displaying data stored in said electronic card.

13. The system of claim 12 in which said display means is a liquid crystal display.

14. The system of claim 12 in which said display means displays a golfer's handicap index.

15. The golf handicap system of claim 1 in which said electronic card has an internal memory capable of storing data in an addressable format.

16. The golf handicap system of claim 15 in which at least a portion of said data is irreversibly stored into said internal memory.

17. The golf handicap system of claim 1 in which said electronic card retains data for approximately ten years.

18. The golf handicap system of claim 1 in which said electronic card has a memory for storing data and means for irreversibly blocking access to said memory.

19. A method for updating a golf handicap index comprising the steps of:

storing data for an individual golfer on an electronic card having transceiving means for transmitting and receiving data via radio frequency;

transmitting data from said electronic card to a card reading/writing means, said card reading/writing means comprising a proximity transceiving means for receiving data from and transmitting data to said electronic card via radio frequency without making physical contact with said electronic card;

displaying data stored in said electronic card on a monitor having a touch responsive screen;

displaying data stored in a database, said data including at least one score for a round of golf played by a golfer;

inputting data into said central processing unit via said touch responsive screen;

automatically updating a golfer's handicap index and index month on said electronic card; and providing correcting means for correcting the last score entered by a golfer, said correcting means including means for allowing the last score entered by a golfer to be corrected during a set period of time and means for preventing the correcting of the last score entered by a golfer after said set period of time expires.

20. The method of claim 19 further including the step of displaying multimedia data on said monitor when said monitor is not being used for inputting data.

21. The method of claim 20 in which said step of displaying multimedia data is automatically activated when said monitor is not being used for inputting data, and the step of automatically deactivating the step of displaying the multimedia data when said monitor is being used for inputting data.

22. The method of claim 21 in which said step of automatically deactivating said multimedia display occurs when said electronic card is in proximity to said proximity transceiving means.

* * * * *